US012603352B2

(12) United States Patent
Hong et al.

(10) Patent No.: US 12,603,352 B2
(45) Date of Patent: Apr. 14, 2026

(54) BATTERY PACK HAVING REFRIGERANT CIRCULATION CHANNEL PROVIDED IN PACK CASE

(71) Applicant: LG Energy Solution, Ltd., Seoul (KR)

(72) Inventors: Soon Chang Hong, Daejeon (KR); Hyong Seok Yoo, Daejeon (KR); Chang Hyeon Yang, Daejeon (KR); Hyoung Suk Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 366 days.

(21) Appl. No.: 17/909,841

(22) PCT Filed: May 3, 2021

(86) PCT No.: PCT/KR2021/005535
§ 371 (c)(1),
(2) Date: Sep. 7, 2022

(87) PCT Pub. No.: WO2021/246657
PCT Pub. Date: Dec. 9, 2021

(65) Prior Publication Data
US 2023/0378567 A1 Nov. 23, 2023

(30) Foreign Application Priority Data
Jun. 2, 2020 (KR) .................. KR10-2020-0066467

(51) Int. Cl.
*H01M 10/613* (2014.01)
*H01M 10/6554* (2014.01)
*H01M 10/656* (2014.01)

(52) U.S. Cl.
CPC ....... *H01M 10/656* (2015.04); *H01M 10/613* (2015.04); *H01M 10/6554* (2015.04)

(58) Field of Classification Search
CPC ............. H01M 10/656; H01M 10/613; H01M 10/6554; H01M 50/204; H01M 10/6556;
(Continued)

(56) References Cited

U.S. PATENT DOCUMENTS 10,056,658 B2 * 8/2018 Park .................. H01M 10/6556
2013/0309543 A1 11/2013 Kim et al.
(Continued)

FOREIGN PATENT DOCUMENTS

CN 103650200 A 3/2014
CN 104981937 A 10/2015
(Continued)

OTHER PUBLICATIONS

KR20140143854A description translated (Year: 2014).*
(Continued)

*Primary Examiner* — Matthew T Martin
*Assistant Examiner* — Kevin Song
(74) *Attorney, Agent, or Firm* — Lerner David LLP

(57) ABSTRACT

The present invention relates to a battery pack having a refrigerant circulation channel, and more particularly to a battery pack having a refrigerant circulation channel provided in a pack case, the battery pack including at least one battery module; a pack case configured to receive the battery module therein; and a cooling unit located between an inside upper surface of the pack case and the battery module, the cooling unit being configured to discharge heat generated from the battery module, wherein the pack case is provided with a refrigerant circulation channel configured to supply and collect a refrigerant to and from the cooling unit.

8 Claims, 8 Drawing Sheets

(58) Field of Classification Search
CPC .......... H01M 10/625; H01M 10/6551; H01M
10/6566; H01M 10/6568; H01M 50/20;
H01M 2220/20; Y02E 60/10
See application file for complete search history.

(56) References Cited

U.S. PATENT DOCUMENTS

| | | | |
|---|---|---|---|
| 2014/0193686 A1 | 7/2014 | Siering et al. | |
| 2014/0356664 A1* | 12/2014 | Jung .................. H01M 50/291 | |
| | | | 429/82 |
| 2016/0087319 A1 | 3/2016 | Roh et al. | |
| 2018/0154754 A1* | 6/2018 | Rowley .................. B60K 1/04 | |
| 2018/0191041 A1 | 7/2018 | Jeon et al. | |
| 2019/0074562 A1 | 3/2019 | Kim et al. | |
| 2019/0198951 A1 | 6/2019 | Tong et al. | |
| 2019/0393567 A1 | 12/2019 | Ju et al. | |
| 2020/0220128 A1 | 7/2020 | Kim et al. | |
| 2020/0358127 A1 | 11/2020 | Terauchi et al. | |
| 2021/0119282 A1 | 4/2021 | Wünsche et al. | |
| 2022/0231366 A1 | 7/2022 | Kim et al. | |

FOREIGN PATENT DOCUMENTS

| | | | | |
|---|---|---|---|---|
| CN | 205069810 U | 3/2016 | | |
| CN | 107709069 A | 2/2018 | | |
| CN | 109713177 A | 5/2019 | | |
| CN | 209860115 U | 12/2019 | | |
| CN | 210040354 U | 2/2020 | | |
| CN | 210516779 U | 5/2020 | | |
| DE | 102011084660 A1 | 4/2013 | | |
| EP | 3343669 A1 | 7/2018 | | |
| EP | 3584877 A1 * | 12/2019 | ........ | H01M 10/6568 |
| GB | 2541203 A | 2/2017 | | |
| JP | 2014509441 A | 4/2014 | | |
| JP | 2019530191 A | 10/2019 | | |
| KR | 20140143854 A * | 12/2014 | | |
| KR | 101589996 B1 | 1/2016 | | |
| KR | 20160041407 A * | 4/2016 | | |
| KR | 20160075068 A | 6/2016 | | |
| KR | 101818922 B1 * | 1/2018 | | |
| KR | 20180080614 A | 7/2018 | | |
| KR | 102045461 B1 | 11/2019 | | |
| KR | 102050025 B1 | 1/2020 | | |
| WO | 2019107795 A1 | 6/2019 | | |
| WO | 2019146238 A1 | 8/2019 | | |
| WO | 2019221376 A1 | 11/2019 | | |

OTHER PUBLICATIONS

KR20140143854A claims translated (Year: 2014).*
KR20160041407A description translated (Year: 2016).*
KR20160041407A claims translated (Year: 2016).*
KR20140143854A_Translation_Description (Year: 2014).*
KR20160041407A_Translation_Description (Year: 2016).*
KR20140143854A_Translation_Claims (Year: 2014).*
KR20160041407A_Translation_Claims (Year: 2016).*
Extended European Search Report including Written Opinion for Application No. 21818804.3 dated May 22, 2024. 7 PGS.
International Search Report for Application No. PCT/KR2021/005535 mailed Aug. 6, 2021, 2 pages.
Search Report dated Mar. 23, 2025 from the Office Action for Chinese Application No. 202180015921.3 issued Mar. 26, 2025, pp. 1-4.
Search Report dated Jan. 12, 2026 from the Office Action for Chinese Application No. 202180015921.3 issued Jan. 30, 2026, pp. 1-2.

* cited by examiner

【FIG. 1】
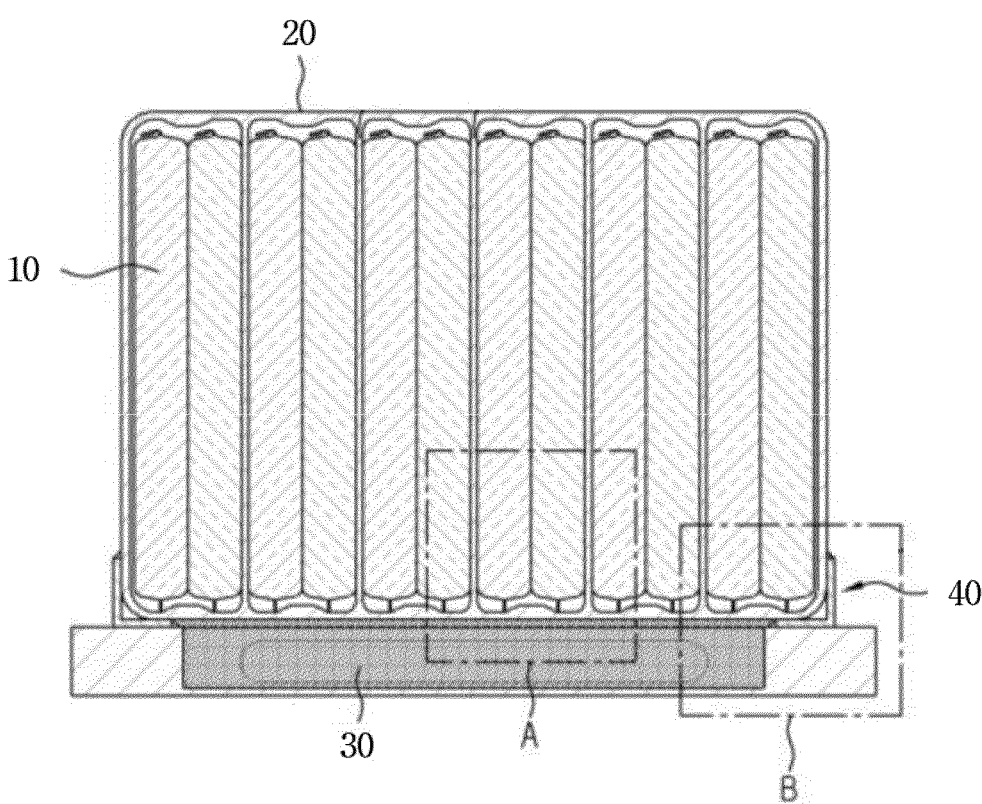

【FIG. 2】
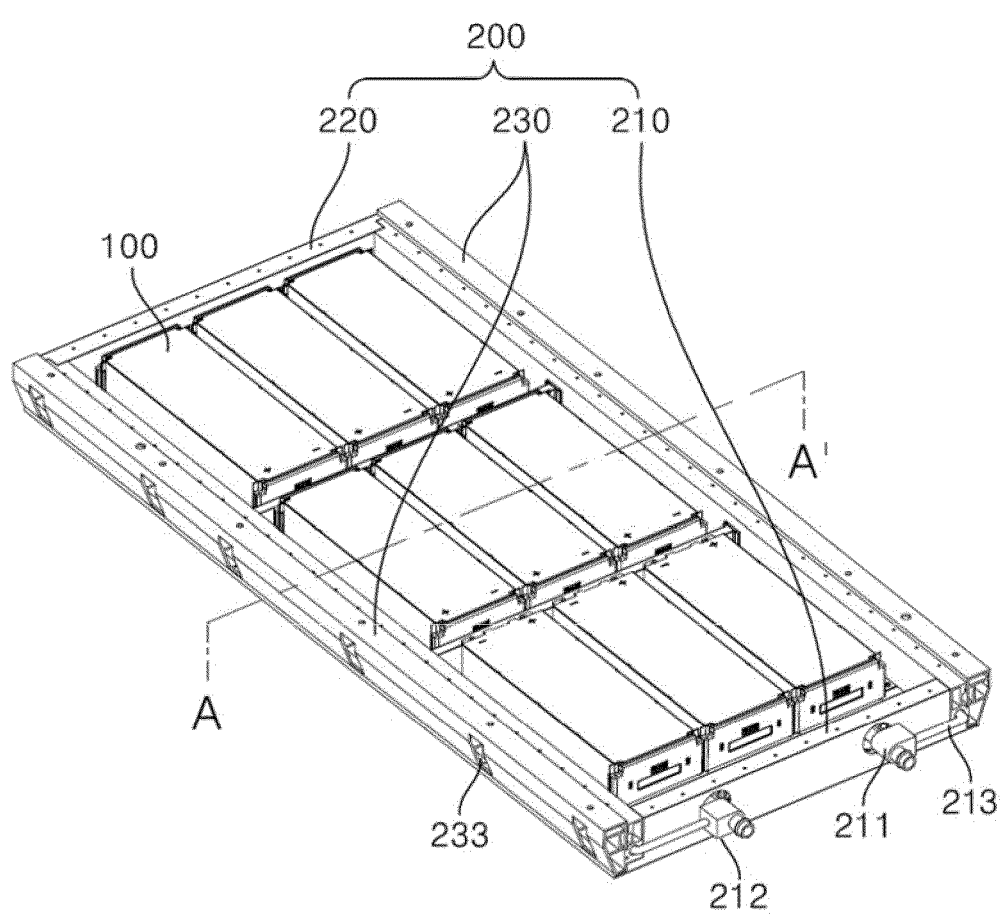

【FIG. 3】
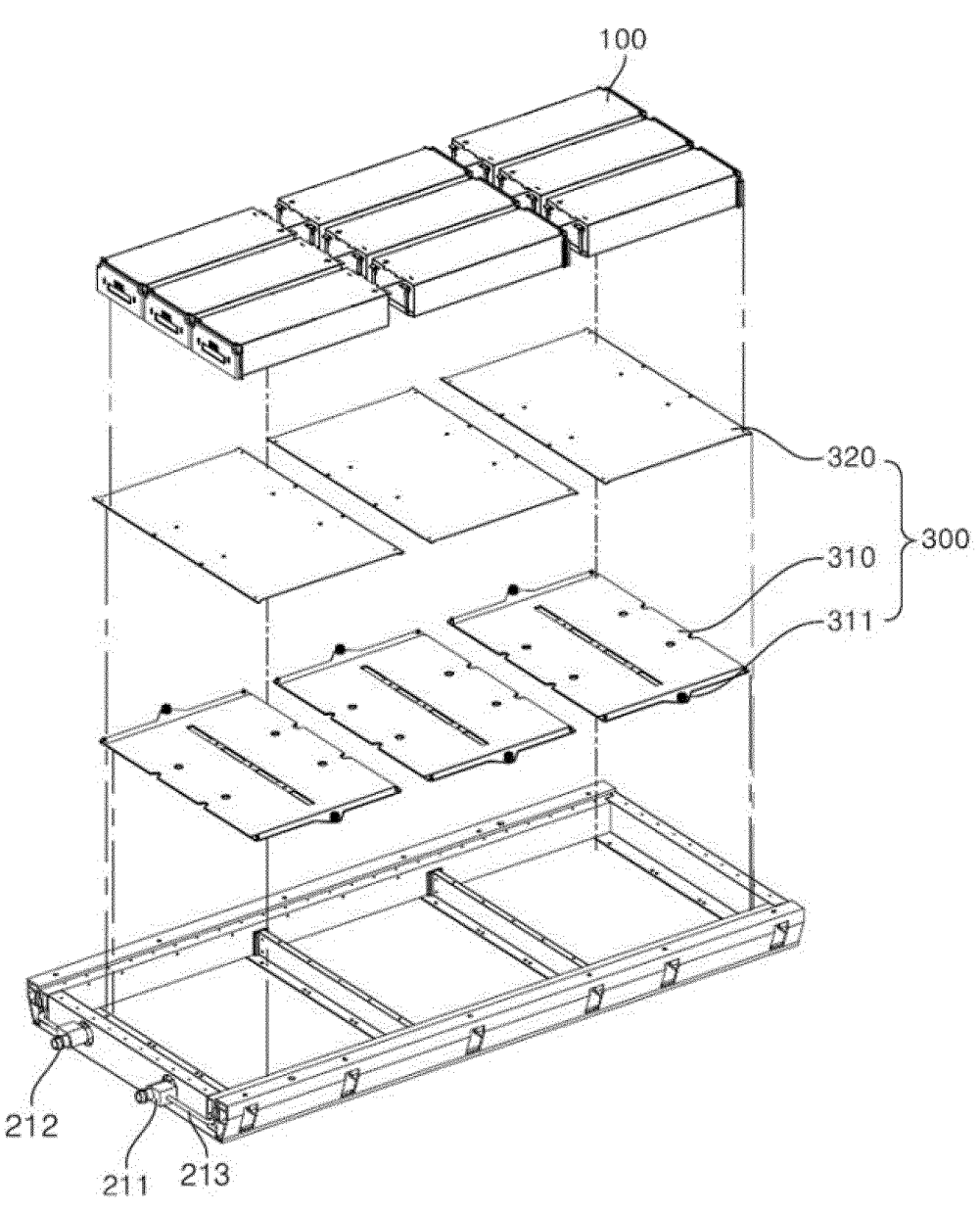

【FIG. 4】
A-A'
230                                               230
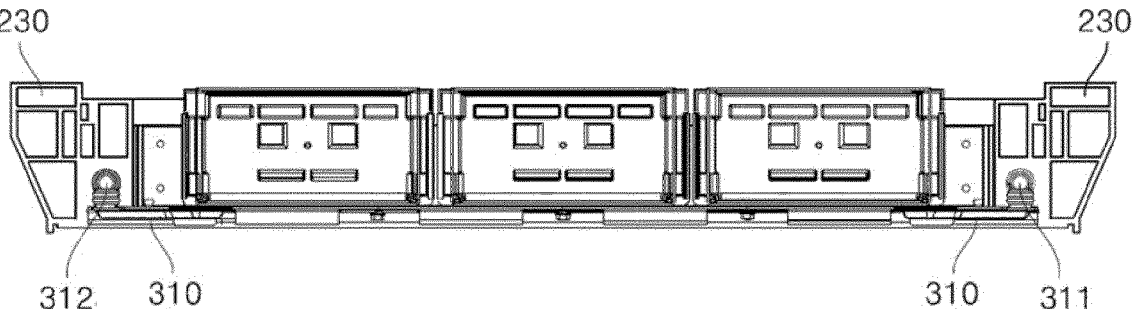
312    310                                     310    311

【FIG. 5】
230
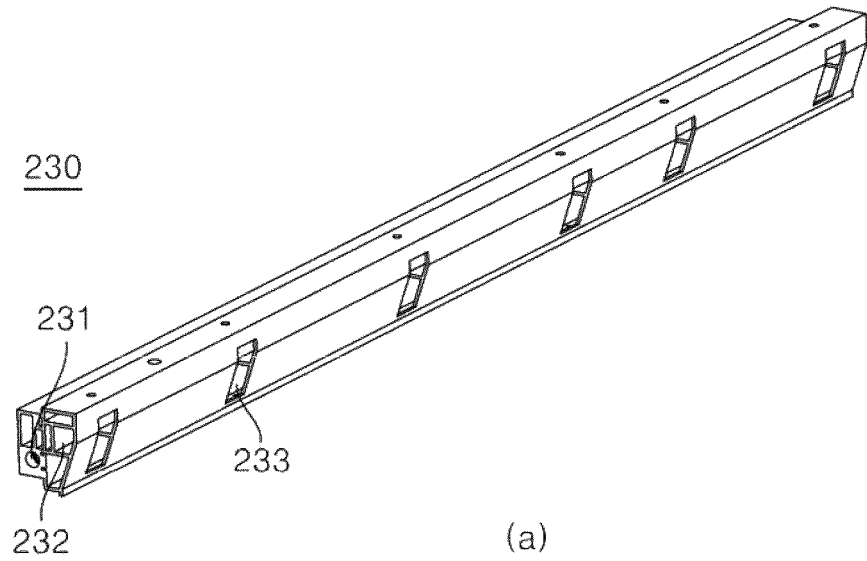
231
233
232
(a)
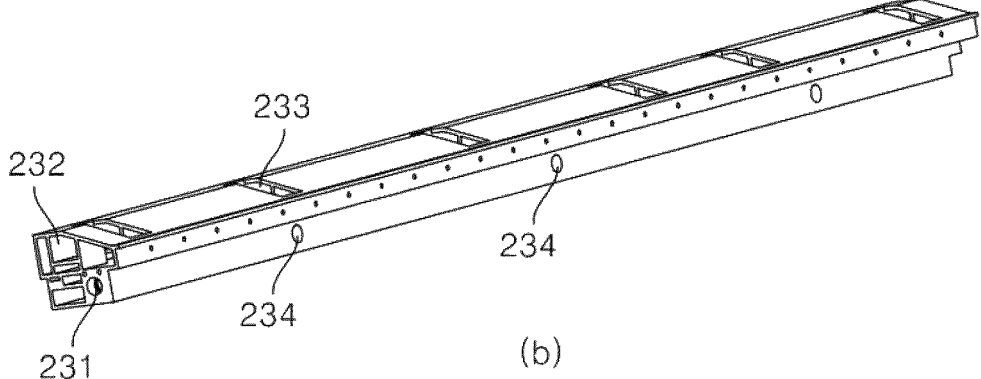
233
232
234
231     234
(b)

【FIG. 6】
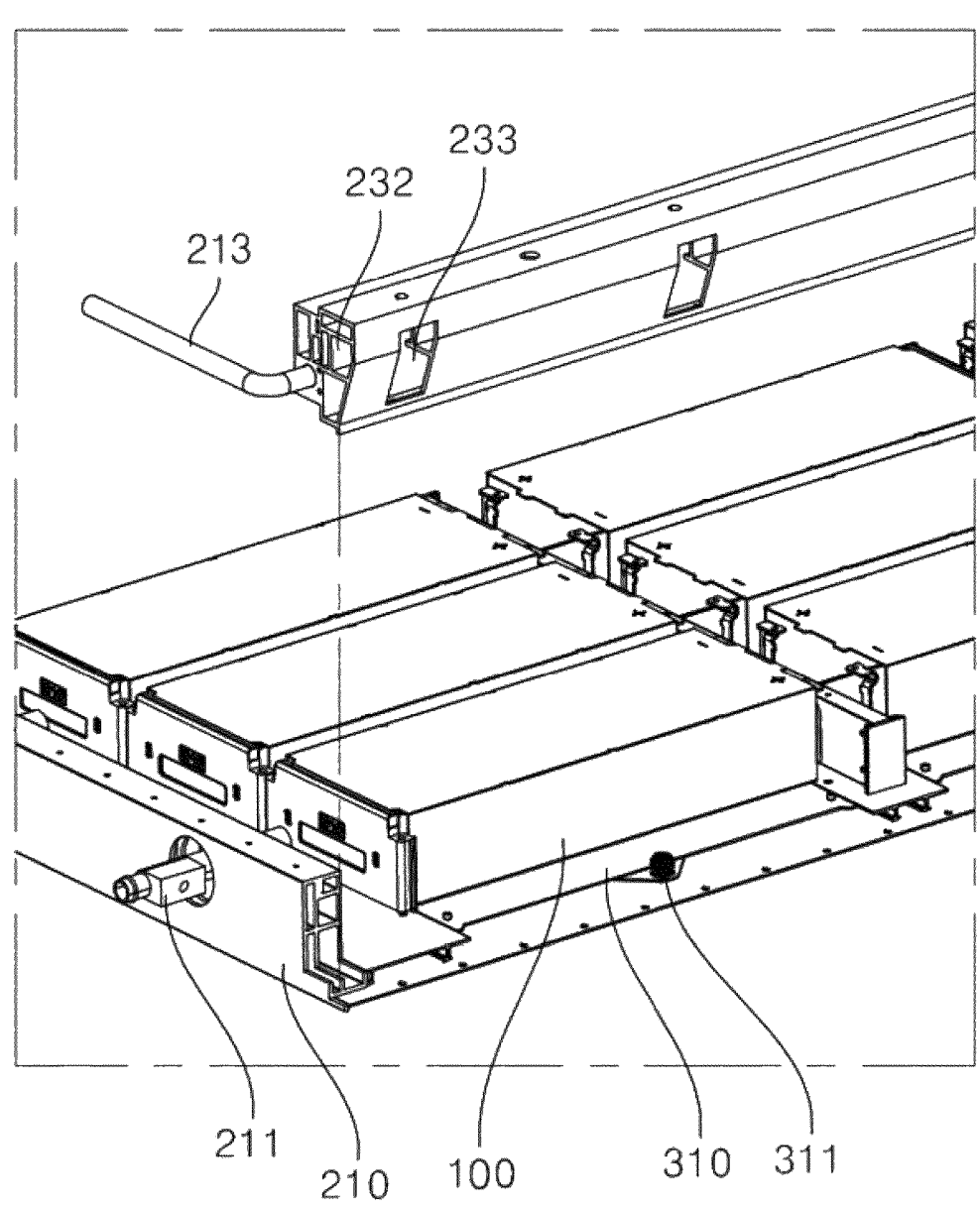

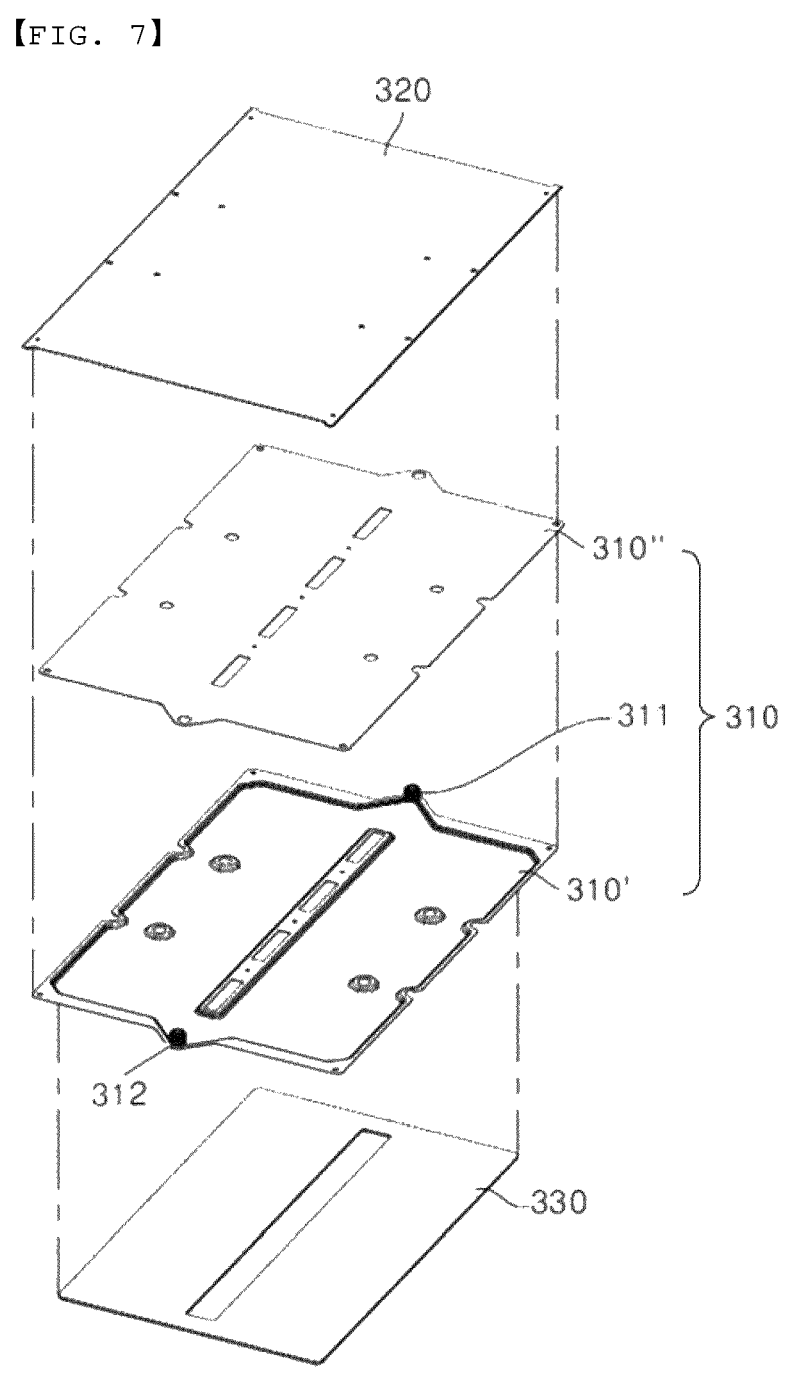

【FIG. 7】

【FIG. 8】
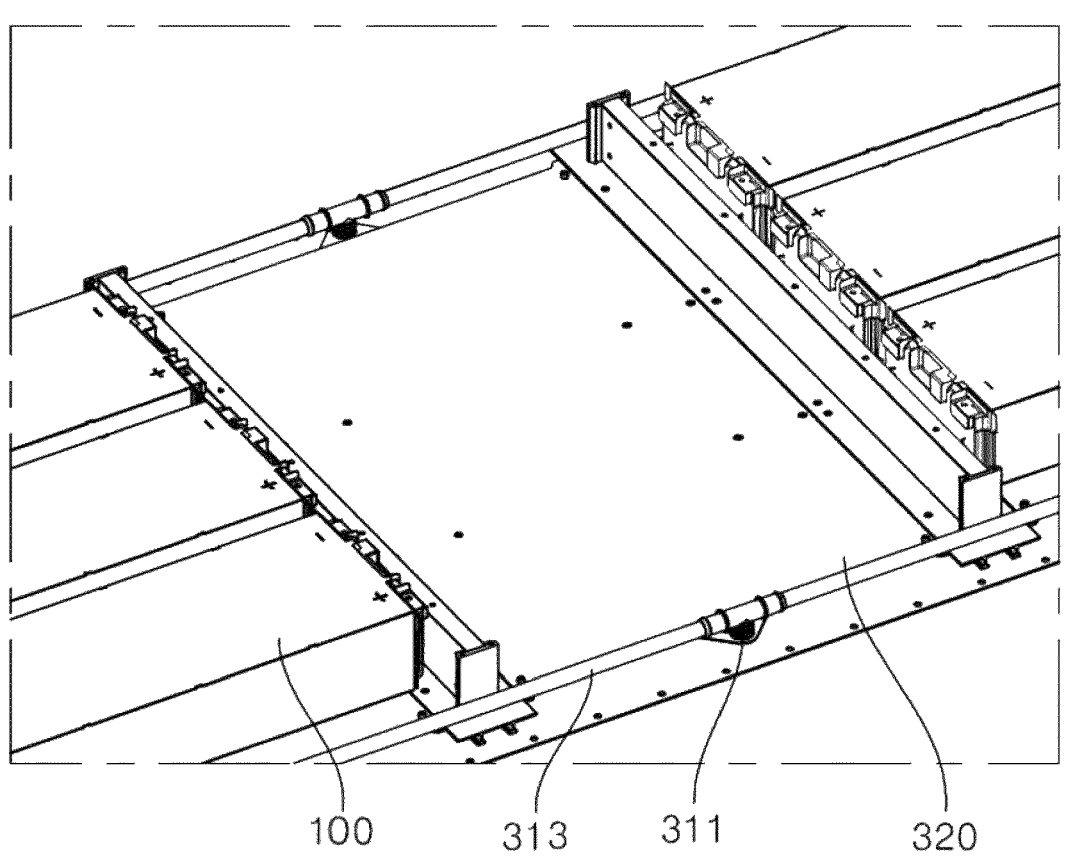
100     313     311     320

BATTERY PACK HAVING REFRIGERANT CIRCULATION CHANNEL PROVIDED IN PACK CASE

CROSS-REFERENCE TO RELATED APPLICATIONS

This application is a national phase entry under 35 U.S.C. § 371 of International Application No. PCT/KR2021/005535, filed on May 3, 2021, which claims priority to Korean Patent Application No. 10-2020-0066467, filed on Jun. 2, 2020, the disclosures of which are hereby incorporated herein by reference in their entireties.

TECHNICAL FIELD

The present invention relates to a battery pack having a refrigerant circulation channel provided in a pack case, and more particularly to a battery pack having a refrigerant circulation channel provided in a pack case, wherein the refrigerant circulation channel, which is configured to discharge heat generated from a battery module, is provided in a frame, whereby it is possible to prevent leakage of a refrigerant and to reduce the volume of the battery pack while maintaining existing cooling performance.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

In the battery module or the battery pack, a plurality of battery cells is connected to each other in series or in parallel in order to increase capacity and output of the battery module or the battery pack. In the case in which a plurality of battery cells is used in a state of being connected to each other, a problem, such as overload, may occur. In particular, for the battery pack, a battery module including a plurality of battery cells is located in a case. As a result, there is a problem in that temperature in the battery pack increases due to overload, whereby abnormality of the battery is amplified. In order to solve this problem, it is necessary for a general battery pack to have a cooling unit capable of lowering the temperature of the battery, whereby safety of the battery is improved, space efficiency of the battery is improved, and energy density of the battery is improved.

FIG. 1 is a sectional view of a conventional battery module. As shown in FIG. 1, the conventional battery module includes a module case 20 configured to receive battery cells 10 therein, a heat sink 30 located at the lower surface of the battery module, and a protection member 40 configured to wrap the lower surface of the battery module.

In the disclosed battery module, the heat sink 30, which is in contact with the lower surface of the battery module, is provided with an opening formed by cutting a predetermined area thereof, whereby it is possible to improve efficiency of cooling the battery module and to prevent a refrigerant in the heat sink from leaking out of a contact interface thereof through the protection module 40.

In the conventional art, as described above, a heat exchange process between the battery module and the refrigerant in the heat sink 30 is improved, whereby cooling performance is improved. Since a refrigerant supply line (not shown) configured to supply and collect the refrigerant to and from the heat sink 30 is exposed, however, there is a problem in that the volume of the battery pack is large.

In addition, since the refrigerant supply line (not shown), in which the refrigerant flows, is exposed, the refrigerant may leak due to damage to the refrigerant supply line when external impact is applied thereto, which may lead to a serious accident.

PRIOR ART DOCUMENT (Patent Document 1) Korean Registered Patent Publication No. 2050025

DISCLOSURE

Technical Problem

The present invention has been made in view of the above problems, and it is an object of the present invention to provide a battery pack configured such that leakage of a refrigerant from the battery pack is minimized.

It is another object of the present invention to provide a battery pack configured such that an increase in volume of the battery pack due to various parts configured to perform cooling is inhibited.

It is a further object of the present invention to provide a battery pack configured such that leakage of a refrigerant is restricted even in the case in which a frame is damaged due to external impact.

Technical Solution

In order to accomplish the above objects, a battery pack according to the present invention includes at least one battery module (100); a pack case (200) configured to receive the battery module (100) therein; and a cooling unit (300) located between an inside upper surface of the pack case (200) and the battery module (100), the cooling unit being configured to discharge heat generated from the battery module (100).

The pack case (200) may be provided with a refrigerant circulation channel (231) configured to supply and collect a refrigerant to and from the cooling unit (300).

Also, in the battery pack according to the present invention, the pack case (200) may include a front frame (210), a rear frame (220), and a pair of side frames (230) configured to connect the front frame (210) and the rear frame (220) to each other.

The refrigerant circulation channel (231) may be provided in each of the pair of side frames (230).

Also, in the battery pack according to the present invention, the front frame (210) may be provided with a pair of refrigerant introduction port (211) and a refrigerant discharge port (212) spaced apart from each other by a predetermined distance, and a refrigerant transfer pipe (213)

configured to communicate with the refrigerant circulation channel (231) may be connected to each of the refrigerant introduction port (211) and the refrigerant discharge port (212).

Also, in the battery pack according to the present invention, an air circulation channel (232) may be located in the vicinity of the refrigerant circulation channel (231) of the side frame (230) so as to be parallel to the refrigerant circulation channel (231).

Also, in the battery pack according to the present invention, the air circulation channel (232) may be provided with at least one incision portion (233) configured to allow external air to pass therethrough.

Also, in the battery pack according to the present invention, the cooling unit (300) may include a heat sink (310), a first heat dissipation plate (320) located between the heat sink (310) and the pack case (200), and a second heat dissipation plate (330) located between the heat sink (310) and the bottom surface of the pack case (200).

Also, in the battery pack according to the present invention, the heat sink (310) may include a pair of a lower plate (310') and an upper plate (310") configured to provide a space in which a refrigerant is circulated and a refrigerant inlet (311) and a refrigerant outlet (312) detachably coupled to the refrigerant circulation channel (231).

Also, in the battery pack according to the present invention, the side frame (230) may be provided in the bottom surface thereof with fastening holes (234) connected to the refrigerant inlet (311) and the refrigerant outlet (312).

Also, in the battery pack according to the present invention, a refrigerant circulation pipe (313) configured to supply and collect the refrigerant to and from the cooling unit (300) may be received in the refrigerant circulation channel (231) of the pack case (200).

In addition, the present invention may provide a device having mounted therein the battery pack having one or more of the features mentioned above.

Advantageous Effects

As is apparent from the above description, a battery pack having a refrigerant circulation channel provided in a pack case according to the present invention has a merit in that the refrigerant circulation channel (231) is provided in a side frame (230), whereby it is possible to minimize leakage of a refrigerant even in the case in which external impact is applied thereto.

Also, in the battery pack having the refrigerant circulation channel provided in the pack case according to the present invention, it is possible to reduce the overall volume of the battery pack, which may contribute to improvement in energy density thereof, since the refrigerant circulation channel (231) is provided in the side frame (230).

Furthermore, the battery pack having the refrigerant circulation channel provided in the pack case according to the present invention has an advantage in that an air circulation channel (232) is further provided in the side frame (230) along the refrigerant circulation channel (231), whereby it is possible to improve cooling efficiency and to reduce the overall weight of the battery pack.

DESCRIPTION OF DRAWINGS

FIG. 1 is a sectional view of a conventional battery module.

FIG. 2 is a perspective view of a battery pack according to a preferred embodiment of the present invention.

FIG. 3 is an exploded perspective view of the battery pack according to the preferred embodiment of the present invention.

FIG. 4 is a sectional view taken along line A-A' of FIG. 2.

FIG. 5 is a perspective view showing a side frame according to a preferred embodiment of the present invention.

FIG. 6 is a perspective view illustrating coupling of the side frame according to the preferred embodiment of the present invention.

FIG. 7 is an exploded perspective view of a cooling unit according to a preferred embodiment of the present invention.

FIG. 8 is a partial perspective view illustrating a battery pack according to a second preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

FIG. 2 is a perspective view of a battery pack according to a preferred embodiment of the present invention, and FIG. 3 is an exploded perspective view of the battery pack according to the preferred embodiment of the present invention.

Referring to FIGS. 2 and 3, the battery pack according to the present invention includes a battery module 100, a pack case 200 configured to receive the battery module 100 therein, and a cooling unit 300 configured to remove heat generated from the battery module 100.

When describing the battery module 100 first, the battery module may include at least one unit cell. Here, the unit cell may include an electrode assembly and a cell case configured to receive the electrode assembly therein. The electrode assembly may be a jelly-roll type electrode assembly, which is configured to have a structure in which a long sheet type positive electrode and a long sheet type negative electrode are wound in the state in which a separator is interposed therebetween, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto. It is preferable for the electrode assembly according to the present invention to be a stacked and folded type electrode assembly or a laminated and stacked type electrode assembly, which has lowest physical stress when a curved module is formed.

The electrode assembly is received in the cell case. The cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Although a total of nine battery modules 100 is shown as being received in the figures, which is merely an illustration, the number of battery modules may be changed.

The pack case 200, which is configured to receive the battery modules 100 therein and to protect the battery modules 100 from external impact, includes a front frame 210, a rear frame 220, and a pair of side frames 230.

Specifically, a pair of a refrigerant introduction port 211 and a refrigerant discharge port 212 is fixed to the front frame 210 in a state of being spaced apart from each other by a predetermined distance, and a pair of refrigerant transfer pipes 213 is connected to these ports so as to extend toward the side frames 230.

Consequently, a refrigerant, cooled to a predetermined temperature, from the outside is injected into the refrigerant introduction port 211 and then flows along the refrigerant transfer pipe 213 connected to the refrigerant introduction port 211. The refrigerant, heated to a predetermined temperature as a result of absorbing heat of the battery modules 100, is discharged through the other refrigerant transfer pipe 213 and the refrigerant discharge port 212. After being cooled to a predetermined temperature, the refrigerant is resupplied.

Here, the pair of the refrigerant transfer pipes 213 supplies and collects the refrigerant to and from the side frames 230. A detailed description related thereto will be given below.

Meanwhile, a plurality of partition walls may be provided on the bottom surface of the pack case 200 such that the battery modules 100 are spaced apart from each other by a predetermined distance.

The cooling unit 300, which is configured to remove heat generated from the battery modules 100, is located between the battery modules 100 and an inside upper surface of the pack case 200, and includes a heat sink 310 and a first heat dissipation plate 320 between the heat sink 310 and the pack case 200. A detailed description related thereto will be given below.

FIG. 4 is a sectional view taken along line A-A' of FIG. 2, FIG. 5 is a perspective view showing a side frame according to a preferred embodiment of the present invention, and FIG. 6 is a perspective view illustrating coupling of the side frame according to the preferred embodiment of the present invention.

Referring to FIGS. 4 to 6, the pair of side frames 230 according to the present invention is spaced apart from each other by a predetermined distance in order to connect the front frame 210 and the rear frame 220 to each other, and each side frame 230 is provided with a refrigerant circulation channel 231 connected to a corresponding one of the refrigerant transfer pipes 213, an air circulation channel 232, an incision portion 233, and a fastening hole 234.

First, the refrigerant circulation channel 231 connected to one side of the refrigerant transfer pipe 213 is configured to have a shape extending through the side frame 230 in a longitudinal direction thereof. Consequently, a cool refrigerant to be supplied to the heat sink 310 flows in the refrigerant circulation channel 231 connected to the refrigerant transfer pipe 213 communicating with the refrigerant introduction port 211, and a refrigerant heated to a predetermined temperature as a result of heat absorption moves in the refrigerant circulation channel 231 connected to the refrigerant transfer pipe 213 communicating with the refrigerant discharge port 212.

Conventionally, the refrigerant circulation channel is separately manufactured and is then connected to the side surface or the bottom surface of the pack case, and therefore the refrigerant circulation channel may be easily damaged due to external impact. Furthermore, there is a problem in that a refrigerant that leaks from the refrigerant circulation channel as a result of damage to the refrigerant circulation channel may cause a new event.

In contrast, the refrigerant circulation channel 231 according to the present invention is provided in the side frame 230, and therefore there are advantages in that a danger of damage to the refrigerant circulation channel due to external impact may be minimized and the overall volume of the battery pack may be reduced.

The air circulation channel 232 is located in the state in which a separation wall is disposed between the air circulation channel and the refrigerant circulation channel 231 such that no refrigerant leaks into the air circulation channel. At this time, the air circulation channel extends long parallel to the refrigerant circulation channel 231 such that the refrigerant moving in the refrigerant circulation channel 231 is cooled as naturally as possible.

Furthermore, the air circulation channel 232 is provided with at least one incision portion 233, through which external air may pass, whereby more efficient cooling is possible. That is, since the air circulation channel 232 is further provided in the side frame 230 along the refrigerant circulation channel 231, it is possible to rapidly cool the battery pack and to reduce the overall weight of the battery pack.

Meanwhile, each of the pair of side frames 230 is provided in the bottom surface thereof with at least one fastening hole 234 configured to communicate with the refrigerant circulation channel 231, more specifically fastening holes 234 equal in number to refrigerant inlets 311 or refrigerant outlets 312 of the heat sink 310 located under the battery modules 100.

For example, for the side frame 230 sequentially connected to the refrigerant introduction port 211 and the refrigerant transfer pipe 213, the fastening holes 234 formed in the bottom surface of the side frame 230 are respectively fixed to the refrigerant inlets 311 of the heat sink 310 by fastening. Consequently, a refrigerant introduced into the refrigerant introduction port 211 sequentially moves along the refrigerant transfer pipe 213 and the refrigerant circulation channel 231 and is then supplied to the refrigerant inlets 311 of the heat sink 310.

In the same manner, the other side frame 230 connected to the refrigerant discharge port 212 and the refrigerant transfer pipe 213 has the same coupling structure as described above, and a heated refrigerant is circulated in the order of the refrigerant outlets 312 of the heat sink 310, the refrigerant transfer pipe 213, and the refrigerant discharge port 212.

FIG. 7 is an exploded perspective view of a cooling unit according to a preferred embodiment of the present invention. When describing the cooling unit with reference to FIG. 7, the cooling unit 300 includes a heat sink 310, a first heat dissipation plate 320, and a second heat dissipation plate 330.

The heat sink 310 is constituted by a pair of a lower plate 310' and an upper plate 310" in order to provide a space in which a refrigerant is circulated. Here, the lower plate 310' is provided with a pair of a refrigerant inlet 311 and a refrigerant outlet 312 facing each other, to which the fastening holes 234 formed in the bottom surfaces of the side frames 230 are coupled, as previously described.

Meanwhile, the first heat dissipation plate 320 is located between the heat sink 310 and the battery modules 100, and the second heat dissipation plate 330 is located under the heat sink 310, whereby heat generated from the battery modules 100 is transmitted to the heat sink 310.

Particularly, since the first heat dissipation plate 320 and the second heat dissipation plate 330 are located at the upper surface and the lower surface of the heat sink 310, respectively, so as to wrap the heat sink 310 once more, there is an advantage in that, even in the case in which refrigerant leakage occurs, it is possible to prevent the refrigerant from permeating into the battery pack.

It is preferable for each of the heat sink 310, the first heat dissipation plate 320, and the second heat dissipation plate 330 to be made of a material that exhibits high thermal conductivity, such as aluminum.

FIG. 8 is a partial perspective view illustrating a battery pack according to a second preferred embodiment of the present invention.

Referring to FIG. 8, the battery pack according to the second preferred embodiment of the present invention may further include a refrigerant circulation pipe 313.

In the embodiment described with reference to FIGS. 2 to 7, a refrigerant is circulated along the refrigerant circulation channel 231 of the side frame 230, whereas the refrigerant circulation pipe 313 is further provided in the second embodiment.

That is, the refrigerant transfer pipe 213 and the refrigerant circulation pipe 313 are connected to each other such that a refrigerant introduced into or discharged from the refrigerant transfer pipe 213 passes though the refrigerant circulation pipe 313, and the refrigerant circulation pipe 313 is disposed in the refrigerant circulation channel 231 of the side frame 230.

Since the refrigerant circulation pipe 313 is located in the refrigerant circulation channel 231, as described above, it is possible to securely prevent leakage of the refrigerant, thus inhibiting occurrence of an event, even in the case in which the side case 230 is damaged due to external impact.

The present invention may provide a device having mounted therein the battery pack having at least one of the features described above. The device may be an electronic device including a large-capacity battery, such as an electric vehicle, a hybrid electric vehicle, or a plug-in hybrid electric vehicle.

Those skilled in the art to which the present invention pertains will appreciate that various applications and modifications are possible within the category of the present invention based on the above description.

| (Description of Reference Numerals) |
| --- |
| 100: Battery module |
| 200: Pack case |
| 210: Front frame |
| 211: Refrigerant introduction port |
| 212: Refrigerant discharge port |
| 213: Refrigerant transfer pipe |
| 220: Rear frame |
| 230: Side frame |
| 231: Refrigerant circulation channel |
| 232: Air circulation channel |
| 233: Incision portion |
| 234: Fastening hole |
| 300: Cooling unit |
| 310: Heat sink |
| 310': Lower plate |
| 310": Upper plate |
| 311: Refrigerant inlet |
| 312: Refrigerant outlet |
| 313: Refrigerant circulation pipe |
| 320: First heat dissipation plate |
| 330: Second heat dissipation plate |

The invention claimed is:

1. A battery pack, comprising:

at least one battery module;

a pack case configured to receive the at least one battery module therein, the pack case having a front frame, a rear frame, and a pair of side frames connecting the front frame and the rear frame to each other; and a cooling unit located inside the pack case between an inside upper surface of the pack case and a bottom exterior surface of each of the at least one battery module, the cooling unit being configured to discharge heat generated from the at least one battery module, the cooling unit having a major planar surface contacting and extending parallel to a major planar surface of each of the at least one battery module, the cooling unit extending between the pair of side frames, wherein the pack case is provided with a refrigerant circulation channel system therein configured to supply and collect a refrigerant to and from the cooling unit, the refrigerant circulation channel system including a pair of refrigerant circulation channels respectively provided in the pair of side frames, each refrigerant circulation channel having a respective refrigerant circulation pipe received therein and configured to supply and collect the refrigerant to and from the cooling unit, and wherein the pair of side frames each have a respective air circulation channel located adjacent to the respective refrigerant circulation channel, each air circulation channel extending in a direction parallel to the respective refrigerant circulation channel, each air circulation channel not being in communication with an interior of the pack case.

2. A battery pack, comprising:

at least one battery module;

a pack case configured to receive the at least one battery module therein, the pack case having a front frame, a rear frame, and a pair of side frames connecting the front frame and the rear frame to each other; and a cooling unit located inside the pack case between an inside upper surface of the pack case and a bottom exterior surface of each of the at least one battery module, the cooling unit being configured to discharge heat generated from the at least one battery module, the cooling unit having a major planar surface contacting and extending parallel to a major planar surface of each of the at least one battery module, the cooling unit extending between the pair of side frames, wherein the pack case is provided with a refrigerant circulation channel system therein configured to supply and collect a refrigerant to and from the cooling unit, the refrigerant circulation channel system including a pair of refrigerant circulation channels respectively provided in the pair of side frames, wherein the pair of side frames each have a respective air circulation channel located adjacent to the respective refrigerant circulation channel, each air circulation channel extending in a direction parallel to the respective refrigerant circulation channel, each air circulation channel not being in communication with an interior of the pack case, and wherein the front frame has a refrigerant introduction port and a refrigerant discharge port spaced apart from each other, and the battery pack further comprises a pair of refrigerant transfer pipes in communication with the pair of refrigerant circulation channels, respectively, the pair of refrigerant transfer pipes being respectively connected to the refrigerant introduction port and the refrigerant discharge port.

3. The battery pack according to claim 1, wherein each air circulation channel has at least one incision portion configured to allow external air to pass therethrough.

4. The battery pack according to claim 1, wherein the cooling unit comprises:

a heat sink;

a first heat dissipation plate located between the heat sink and the at least one battery module; and a second heat dissipation plate located between the heat sink and the inside upper surface of the pack case.

5. The battery pack according to claim 4, wherein the heat sink comprises:

a lower plate and an upper plate together forming a space therebetween in configured to receive circulation of a refrigerant therethrough; and a refrigerant inlet and a refrigerant outlet each detachably coupled to a respective one of the refrigerant circulation channels.

6. The battery pack according to claim 5, wherein a bottom surface of each side frame has fastening holes extending therethrough, each fastening hole connected to a respective one of the refrigerant inlet or the refrigerant outlet.

7. The battery pack according to claim 2, wherein each refrigerant circulation channel has a respective refrigerant circulation pipe received therein and configured to supply and collect the refrigerant to and from the cooling unit.

8. A device comprising the battery pack according to claim 1.

* * * * *